United States Patent Office 3,272,707

Patented Sept. 13, 1966

3,272,707
PHARMACEUTICAL COMPOSITIONS AND METHODS FOR THEIR USE

David H. Tedeschi, Pennsauken, N.J., assignor to Smith Kline & French Laboratories, Philadelphia, Pa., a corporation of Pennsylvania No Drawing. Filed July 17, 1964, Ser. No. 383,504
11 Claims. (Cl. 167—65)

This application is a continuation-in-part of Serial No. 225,358, filed September 21, 1962 (now abandoned).

This invention relates to 5,6,13,13a-tetrahydro-8-dibenzo-(a,g)-quinolizines, having tranquilizing, antidepressant and antiemetic activity and to methods of producing tranquilization and antidepression, and controlling nausea and vomiting.

The 5,6,13,13a-tetrahydro-8-dibenzo-(a,g)-quinolizines of this invention are characterized by pharmacological effects recognized for tranquilizing activity. For example they selectively block the conditioned avoidance response in rats. Furthermore these quinolizines demonstrate antidepressant activity as shown by pharmacological tests such as ability to potentiate the convulsant effects of picrotoxin in animals. In addition these compounds have antiemetic activity as shown in animals by reduction of the emetic response produced by apomorphine.

More specifically this invention relates to pharmaceutical composition, in dosage unit form, comprising a nontoxic pharmaceutical carrier and a 5,6,13,13a-tetrahydro-8-dibenzo-(a,g)-quinolizine of the following formula:

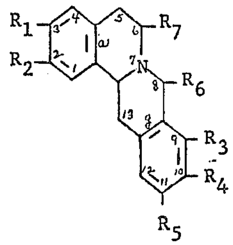

*Formula I* in which:

$R_1$ and $R_2$ represent hydrogen, hydroxy, methoxy, ethoxy or, when taken together, methylenedioxy, preferably methoxy;

$R_3$ and $R_5$ represent hydrogen or methoxy;

$R_4$ represents hydrogen, hydroxy, methoxy or ethoxy, preferably methoxy; and $R_6$ and $R_7$ represent hydrogen or methyl, preferably hydrogen.

A preferred compound in accordance with this invention is 2,3,10,11-tetramethoxy-5,6,13,13a-tetrahydro-8-dibenzo-(a,g)-quinolizine.

The structural formulas depicted herein and in the claims represent the racemic d,l-form of the dibenzo-(a,g)-quinolizines.

The nontoxic pharmaceutically acceptable acid addition salts of the compounds of the above formula are also included within the scope of this invention since such salts likewise have tranquilizing, antidepressant and antiemetic activity. Both organic and inorganic acids can be employed to form pharmaceutically acceptable salts, illustrative acids being sulfuric, nitric, phosphoric, citric, acetic, lactic, tartaric, ethanedisulfonic, sulfamic, succinic, fumaric, maleic, hydrochloric, benzoic and the like. These salts are prepared by methods known to the art.

The 5,6,13,13a-tetrahydro-8-dibenzo-(a,g)-quinolizines of Formula I are advantageously employed in pharmaceutical compositions containing an amount of the compound sufficient to produce tranquilizing, antidepressant and antiemetic activity. Preferably the compositions contain from about 5 mg. to about 150 mg. of the quinolizine compound, advantageously from about 25 mg. to about 100 mg. per dosage unit.

The pharmaceutical carrier employed in the composition can be either a solid or liquid. Exemplary of solid carriers are lactose, magnesium stearate, terra alba, sucrose, talc, stearic acid, gelatin, agar pectin or acacia. Exemplary of liquid carriers are peanut oil, olive oil, sesame oil and water. Similarly the carrier or diluent may include a time delay material such as glyceryl monostearate or glyceryl distearate alone or with a wax.

A wide variety of pharmaceutical forms can be employed and are prepared by methods well known to the art. Thus if a solid carrier is used the composition can be tabletted, used as a pharmaceutical powder, placed in a hard gelatin capsule or in the form of a troche or lozenge. If a liquid carrier is used the composition can be in the form of a soft gelatin capsule or a liquid suspension. Parenteral dosage forms are obtained by dissolving a water-soluble salt of the quinolizine compound in water or saline solution in a concentration such that 1 cc. of the solution contains from about 10 mg. to about 50 mg. of quinolizine compound. The solution can then be filled into single or multiple dose ampules.

Included in this invention is the method of producing tranquilizing, antidepressant and antiemetic activity which comprises internally administering to animals a 5,6,13,13a-tetrahydro-8-dibenzo-(a,g)-quinolizine of Formula I or a nontoxic organic or inorganic acid addition salt thereof, preferably in a pharmaceutical composition such as described above, in an amount sufficient to produce tranquilizing, antidepressant and antiemetic activity. The quinolizine compound in dosage units as described above is administered orally or parenterally in repeated doses. The daily dosage is from about 15 mg. to about 450 mg. of quinolizine compound, advantageously from about 25 mg. to about 300 mg. When the method described above is carried out, tranquilizing, antidepressant and antiemetic activity is produced.

The compounds of Formula I above are prepared by the following general procedure. The appropriately substituted phenylacetic acid and phenethylamine are condensed to give the N-substituted phenylacetamide which is ring closed by hetaing in the presence of phosphorus oxychloride to the 3,4-dihydroisoquinoline. Reduction of the latter with hydrogen and platinum oxide catalyst gives the corresponding 1,2,3,4-tetrahydroisoquinoline. Reaction of the latter with a 37% formaldehyde solution gives the final 5,6,13,13a-tetrahydro-8-dibenzo-(a,g)-quinolizine of Formula I.

The following examples are not limiting but set forth in more detail the preparative procedures for the compounds of Formula I and illustrate specific pharmaceutical compositions of this invention.

*Example 1*

A stirred mixture of 61.0 g. of tetrahydropapaverine hydrochloride and 490 ml. of water is heated on a steam bath as 122 ml. of 37% aqueous formaldehyde solution is added dropwise over a period of 30 minutes. The solution is stirred and heated for an additional 30 minutes and then the solvent removed in vacuo at 50° C. The residue is water-washed and then an aqueous solution is made alkaline with 10% sodium hydroxide solution. The gummy precipitate is extracted with chloroform and the dried extract is concentrated. The residual oil is triturated with ether and the mixture allowed to stand for 12 hours at room temperature. The crystalline precipitate is filtered, ether-washed and recrystallized from alcohol to give 2,3,10,11-tetramethoxy - 5,6,13,13a - tetrahydro - 8 - dibenzo-(a,g)-quinolizine, M.P. 157–159° C. Hydrochloride salt, M.P. 222–224° C.; methane sulfonate salt, M.P. 245–247° C.

*Example 2*

A mixture of 63.0 g. of 4-ethoxy-3-methoxyphenylacetic acid and 54.3 g. of homoveratryl amine is heated in an oil bath at approximately 208° C. for one hour. Trituration with ethyl acetate gives crystalline N-(3,4-dimethoxyphenyl)-4-ethoxy-3-methoxyphenylacetamide.

The above amide (50.0 g.) is suspended in 400 ml. of dry toluene and 150 ml. of phosphorus oxychloride is added. The mixture is stirred and refluxed for one hour, cooled and petroleum ether added. The filtered solid is dissolved in 900 ml. of hot water, extracted with benzene, basified and extracted with chloroform. The dried extract is evaporated to give 1-(4-ethoxy-3-methoxybenzyl)-6,7-dimethoxy-3,4-dihydroisoquinoline.

A suspension of 44.0 g. of the above dihydroisoquinoline and 0.3 g. of platinum oxide in ethanol is shaken over 50 p.s.i. of hydrogen. After two hours, the mixture is filtered and the solvent removed. The residue is dissolved in ethanol and made acid with ethereal-hydrogen chloride to give the hydrochloride of 1-(4-ethoxy-3-methoxybenzyl) - 6,7 - dimethoxy - 1,2,3,4 - tetrahydroisoquinoline, M.P. 192–193.5° C.

A mixture of 10.0 g. of the above tetrahydroisoquinoline hydrochloride in 80 ml. of water is stirred and heated on the steam bath for five minutes and then 24 ml. of 37% formaldehyde solution is added over a 30 minute period. The solution is heated for 40 minutes and the solvent removed. The residue is suspended in water, basified and extracted with chloroform. The dried extract is evaporated to give a solid, 10-ethoxy-2,3,11-trimethoxy - 5,6,13,13a - tetrahydro - 8 - dibenzo - (a,g)-quinoline, M.P. 162–163° C. Hydrochloride salt, 233.5–235.5° C.

*Example 3*

Following the procedure of Example 2, a mixture of 90.5 g. of homoveratryl amine and 68.0 g. of phenylacetic acid is heated in an oil-bath to give N-(3,4-dimethoxyphenethyl)-phenylacetamide. The amide is similarly heated with phosphorus oxychloride in dry toluene to give 1 - benzyl - 6,7 - dimethoxy - 3,4 - dihydroisoquinoline which is subsequently reduced with hydrogen and platinum oxide to the tetrahydroisoquinoline.

A solution of 41.5 g. of 1-benzyl-6,7-dimethoxy-1,2,3,4-tetrahydroisoquinoline (prepared as above) in 210 ml. of ethyl formate is refluxed for 17 hours. The solvent is removed and the residue dissolved in ethyl acetate. Addition of petroleum ether precipitates 1-benzyl-6,7-dimethoxy-1,2,3,4-tetrahydro-N-formylisoquinoline, M.P. 123–124.5° C.

A mixture of the above N-formylisoquinoline (9.0 g.) and 27 ml. of phosphorus oxychloride in 75 ml. of dry toluene is stirred and heated for one hour. To the cooled reaction mixture is added 150 ml. of petroleum ether and after stirring for five minutes is decanted. The residue is extracted with hot water, basified and extracted with chloroform. The dried extract is evaporated and the residue extracted with 20 ml. of concentrated hydrochloric acid. Zinc dust (4.0 g.) is added and the mixture stirred and heated on the steam bath for one hour. The hot reaction mixture is filtered and the subsequent residue is extracted with hot water, made basic and extracted with chloroform. The solvent is removed to give residual 2,3-dimethoxy - 5,6,13,13a - tetrahydro - 8 - dibenzo - (a,g)-quinoline. Hydrochloride salt, M.P. 226–227.5° C.

*Example 4*

A mixture of 58.5 g. of 1-methyl-2-(3,4-dimethoxyphenyl)-ethylamine and 58.8 g. of homoveratric acid is heated in an oil bath at approximately 210–220° C. for one hour. Recrystallization of the residue from ethyl acetate gives N-[1-methyl - 2 - (3,4 - dimethoxyphenyl)-ethyl] - 3,4 - dimethoxyphenylacetamide, M.P. 123.5–125.5° C.

Following the procedure of Example 2, the above amide (50 g.) is refluxed with 150 ml. of phosphorus oxychloride in 400 ml. of toluene. Working up the reaction mixture gives the 1-(3,4-dimethoxybenzyl)-3-methyl-6,7-dimethoxy-3,4-dihydroisoquinoline which is hydrogenated with platinum oxide to the corresponding tetrahydroisoquinoline. Reaction of the latter hydrochloride (10.0 g.) in 150 ml. of 5% hydrochloric acid and 25 ml. of water with 20 ml. of 37% formaldehyde solution on the steam bath for approximately one hour yields 2,3,10,11 - tetramethoxy - 6 - methyl - 5,6,13,13a - tetrahydro-8-dibenzo-(a,g)-quinolizine hydrochloride, M.P. 238.5–240.5° C.

*Example 5*

Following the procedure of Example 2, a mixture of 9.8 g. of homoveratric acid and 7.6 g. of 3-methoxyphenethylamine is heated in an oil bath at approximately 220° C. for one hour to give N-(3-methoxyphenethyl)-3,4-dimethoxyphenylacetamide, M.P. 94.5–96.5° C. The amide (11.8 g.) in 100 ml. of dry toluene is refluxed with 34 ml. of phosphorus oxychloride to give after workup, 1-(3,4 - dimethoxybenzyl)-6-methoxy-3,4-dihydroisoquinoline which is hydrogenated to the corresponding 1,2,3,4-tetrahydroisoquinoline isolated as the hydrochloride salt, M.P. 177–180° C. A mixture of the 1,2,3,4-tetrahydroisoquinoline hydrochloride and 130 ml. of 5% hydrochloric acid solution is stirred and heated on the steam bath for ten minutes. To the solution is added 32.5 ml. of 37% formaldehyde solution dropwise and the mixture heated for 30 minutes thereafter. Workup after treating the reaction mixture with base yields 3,10,11-trimethoxy-5,6,13,13a - tetrahydro - 8-dibenzo-(a,g)-quinolizine, M.P. 128–131° C.

*Example 6*

Following the procedure of Example 2, a mixture of 130 g. of 3-methoxy-4-benzyloxyphenylacetic acid and 86.5 g. of homoveratryl amine is heated in an oil bath at from 205–220° C. for one hour to give N-(3,4-methoxyphenethyl)-4-benzyloxy-3-methoxyphenylacetamide, M.P. 113–115° C. The amide (183.5 g.) in 1500 ml. of dry toluene and 550 ml. of phosphorus oxychloride is stirred and refluxed for 90 minutes to yield 1-(4-benzyloxy-3-methoxybenzyl) - 6,7-dimethoxy-3,4-dihydroisoquinoline, M.P. 100–102° C.

To a stirred, refluxing solution of 106.5 g. of the above dihydroisoquinoline in 1020 ml. of methanol is slowly added 130 ml. of a sodium borohydride reducing solution in 130 ml. of methanol. Thereafter the reaction mixture is refluxed for 15 minutes and then stirred without heat for one hour. The mixture is poured into 2 l. of ice-water, extracted with chloroform and the dried extract is evaporated to give 1-(4-benzyloxy-3-methoxybenzyl)-6,7-dimethoxy - 1,2,3,4-tetrahydroisoquinoline; hydrochloride salt, M.P. 200.5–203° C.

A mixture of 91.0 g. of the above 1,2,3,4-tetrahydroisoquinoline hydrochloride and 1100 ml. of 5% hydrochloric acid solution is stirred and heated at 90° C. while 171 ml. of 37% formaldehyde solution is added over a period of one hour. Heating is continued for 30 minutes and the reaction mixture cooled to give 10-benzyloxy-2,3,11-trimethoxy - 5,6,13,13a-tetrahydro-8-dibenzo-(a,g)-quinolizine hydrochloride, M.P. 224–226° C.

The above dibenzoquinolizine hydrochloride (16.9 g.) and 3.5 g. of 10% palladium on charcoal are suspended in 150 ml. of ethanol and 20 ml. of water, and shaken with warming over 50 p.s.i. of hydrogen. After 90 minutes the reaction mixture is cooled, filtered and concentrated in vacuo to give a small amount of solid. The filter cake is extracted with boiling water, filtered and allowed to cool for 18 hours to give a solid, 10-hydroxy-2,3,11 - trimethoxy - 5,6,13,13a - tetrahydro - 8 - dibenzo-(a,g)-quinolizine hydrochloride, M.P. 240–242.5° C.

*Example 7*

Following the procedure of Example 2, a mixture of 88.0 g. of homoveratric acid and 60.6 g. of phenethylamine is heated to 260° C. slowly and allowed to cool to give N-phenethyl-3,4-dimethoxyphenylacetamide, M.P. 110–112° C.

To a stirred and refluxing mixture of 15 g. of the above amide and 90 g. of sand in 300 ml. of dry xylene is added, in portions over a 30 minute period, 60 g. of phosphorus pentoxide. The resulting mixture is stirred and refluxed for three and one-half hours, cooled in ice and 100 ml. of water added slowly. An additional 500 ml. of water is added and the mixture is filtered. The sand is extracted with warm water. The combined aqueous solution is washed with benzene, made basic and extracted with methylene chloride. The washed and dried extract is evaporated to give 1-(3,4-dimethoxybenzyl)-3,4-dihydroisoquinoline which is hydrogenated over 0.3 g. of platinum oxide at room temperature to give the corresponding 1,2,3,4-tetrahydroisoquinoline; hydrochloride salt, M.P. 221–223° C.

A mixture of 15.0 g. of the above tetrahydroisoquinoline hydrochloride and 140 ml. of 5% hydrochloric acid solution is stirred and heated on the steam bath to affect solution. To the resulting solution is added over a period of 30 minutes, 35.6 ml. of 37% formaldehyde solution and the mixture stirred and heated for 30 minutes. Working up the basified reaction mixture yields 10,11-dimethoxy - 5,6,13,13a - tetrahydro - 8-dibenzo-(a,g)-quinolizine, M.P. 121–123° C. Hydrochloride salt, M.P. 234.5–238° C.

*Example 8*

Following the procedure of Example 2, a mixture of 73.6 g. of 4-ethoxy-3-methoxyphenethylamine and 74.0 g. of homoveratric acid is heated in an oil bath at about 240–260° C. for one hour to give N-(4-ethoxy-3-methoxyphenethyl)-3,4-dimethoxyphenylacetamide, M.P. 100.5–102.5° C. The amide (116.7 g.) in 120 ml. of toluene and 350 ml. of phosphorus oxychloride is stirred and refluxed for one hour. Similar workup procedure yields the 1 - (3,4 - dimethoxybenzyl-6-methoxy-7-ethoxy-3,4-dihydroisoquinoline which is hydrogenated to give the corresponding 1,2,3,4-tetrahydroisoquinoline; hydrochloride salt, M.P. 191–193° C. A mixture of the tetrahydroisoquinoline hydrochloride (10.3 g.) in 100 ml. of 5% hydrochloric acid solution is stirred and heated on the steam bath while 20 ml. of 37% formaldehyde solution is added over a period of 20 minutes. The mixture is then heated for 30 minutes, cooled and filtered to give 2-ethoxy-3,10,11 - trimethoxy - 5,6,13,13a - tetrahydro - 8-dibenzo-(a,g)-quinolizine hydrochloride, M.P. 221–223° C.

*Example 9*

Various strength capsules are prepared containing 2,3,10,11 - tetramethoxy-5,6,13,13a-tetrahydro-8-dibenzo-(a,g)-quinolizine either as the free base or an equivalent amount of a nontoxic pharmaceutically acceptable acid addition salt thereof from the following ingredients:

| Quinolizine, mg. | Lactose, mg. | Magnesium Stearate, mg. |
|---|---|---|
| 5 | 340 | |
| 10 | 330 | 2 |
| 25 | 270 | 2 |
| 50 | 250 | 3 |

The above ingredients are screened, mixed and filled into hard gelatin capsules.

What is claimed is:

1. A pharmaceutical composition having tranquilizing, antidepressant and antiemetic activity, in dosage form, comprising a pharmaceutical carrier and from about 5 mg. to about 150 mg. of a compound selected from the group consisting of d,l-2,3,10,11-tetramethoxy-5,6,13,13a-tetrahydro-8-dibenzo-(a,g)-quinolizine and a nontoxic pharmaceutically acceptable acid addition salt thereof.

2. A pharmaceutical composition having tranquilizing, antidepressant and antiemetic activity, in dosage unit form, comprising a pharmaceutical carrier and from about 25 mg. to about 100 mg. of a compound selected from the group consisting of d,l-2,3,10,11-tetramethoxy-5,6,13,13a-tetrahydro-8-dibenzo-(a,g)-quinolizine and a nontoxic pharmaceutically acceptable acid addition salt thereof.

3. A method of producing tranquilizing and antidepressant activity which comprises internally administering to an animal requiring tranquilization and antidepression an effective amount of a compound selected from the group consisting of a 5,6,13,13a-tetrahydro-8-dibenzo-(a,g)-quinolizine and a nontoxic pharmaceutically acceptable acid addition salt thereof, said dibenzo-(a,g)-quinolizine having the following formula:

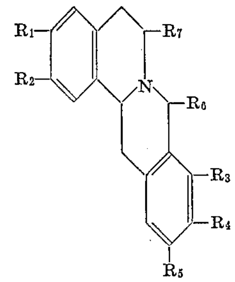

in which:

- $R_1$ and $R_2$ are members selected from the group consisting of hydrogen, hydroxy, methoxy, ethoxy and, when taken together, methylenedioxy;
- $R_3$ and $R_5$ are members selected from the group consisting of hydrogen and methoxy;
- $R_4$ is a member selected from the group consisting of hydrogen, hydroxy, methoxy and ethoxy; and
- $R_6$ and $R_7$ are members selected from the group consisting of hydrogen and methyl.

4. A method of controlling nausea and vomiting which comprises internally administering to an animal requiring control of neausea and vomiting an effective amount of a compound selected from the group consisting of a 5,6,13,13a-tetrahydro-8-dibenzo-(a,g)-quinolizine and a nontoxic pharmaceutically acceptable acid addition salt thereof, said dibenzo-(a,g)-quinolizine having the following formula:

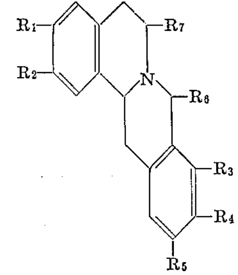

in which:

- $R_1$ and $R_2$ are members selected from the group consisting of hydrogen, hydroxy, methoxy, ethoxy and, when taken together, methylenedioxy;
- $R_3$ and $R_5$ are members selected from the group consisting of hydrogen and methoxy;
- $R_4$ is a member selected from the group consisting of hydrogen, hydroxy, methoxy and ethoxy; and
- $R_6$ and $R_7$ are members selected from the group consisting of hydrogen and methyl.

5. A method of producing tranquilizing, antidepressant and antiemetic activity which comprises internally administering to an animal requiring tranquilization, antidepression and antiemetic action an effective amount of a compound selected from the group consisting of a 5,6,13, 13a-tetrahydro-8-dibenzo-(a,g)-quinolizine and a nontoxic pharmaceutically acceptable acid addition salt thereof, said dibenzo-(a,g)-quinolizine having the following formula:

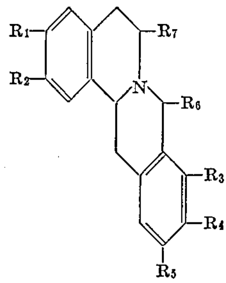

in which:

$R_1$ and $R_2$ are members selected from the group consisting of hydrogen, hydroxy, methoxy, ethoxy and, when taken together, methylenedioxy;
$R_3$ and $R_5$ are members selected from the group consisting of hydrogen and methoxy;
$R_4$ is a member selected from the group consisting of hydrogen, hydroxy, methoxy and ethoxy; and
$R_6$ and $R_7$ are members selected from the group consisting of hydrogen and methyl.

6. The method in accordance with claim 5 in which 2,3,10-11 - tetramethoxy - 5,6,13,13a-tetrahydro-8-dibenzo-(a,g)-quinolizine is administered.

7. The method in accordance with claim 5 in which 2,3,10,11 - tetramethoxy-5,6,13,13a-tetrahydro-8-dibenzo-(a,g)-quinolizine hydrochloride is administered.

8. A method of producing tranquilization and antidepression, and controlling nausea and vomiting which comprises internally administering to an animal requiring tranquilization, antidepression and control of nausea and vomiting, a daily dosage of from about 15 mg. to about 450 mg. of a compound selected from the group consisting of a 5,6,13,13a-tetrahydro-8-dibenzo-(a,g)-quinolizine and a nontoxic pharmaceutically acceptable acid addition salt thereof, said dibenzo-(a,g)-quinolizine having the following formula:

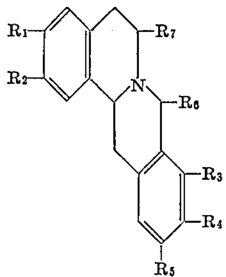

in which:

$R_1$ and $R_2$ are members selected from the group consisting of hydrogen, hydroxy, methoxy, ethoxy and, when taken together, methylenedioxy;

$R_3$ and $R_5$ are members selected from the group consisting of hydrogen and methoxy;
$R_4$ is a member selected from the group consisting of hydrogen, hydroxy, methoxy and ethoxy; and
$R_6$ and $R_7$ are members selected from the group consisting of hydrogen and methyl.

9. A method of producing tranquilization and antidepression, and controlling nausea and vomiting which comprises internally administering to an animal requiring tranquilization, antidepression and control of nausea and vomiting a daily dosage of from about 25 mg. to about 300 mg. of a compound selected from the group consisting of a 5,6,13,13a-tetrahydro-8-dibenzo-(a,g)-quinolizine and a nontoxic pharmaceutically acceptable acid addition salt thereof, said dibenzo-(a,g)-quinolizine having the following formula:

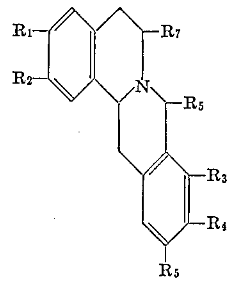

in which:

$R_1$ and $R_2$ are members selected from the group consisting of hydrogen, hydroxy, methoxy, ethoxy and, when taken together, methylenedioxy;
$R_3$ and $R_5$ are members selected from the group consisting of hydrogen and methoxy;
$R_4$ is a member selected from the group consisting of hydrogen, hydroxy, methoxy and ethoxy; and
$R_6$ and $R_7$ are members selected from the group consisting of hydrogen and methyl.

10. The method in accordance with claim 8 in which a daily dosage of from about 15 mg. to about 450 mg. of 2,3,10,11-tetramethoxy-5,6,13,13a-tetrahydro-8-dibenzo-(a,g)-quinolizine is administered.

11. The method in accordance with claim 9 in which a dialy dosage of from about 25 mg. to about 300 mg. of 2,3,10,11 - tetramethoxy-5,6,13,13a-tetrahydro-8-dibenzo-(a,g)-quinolizine is administered.

References Cited by the Examiner

Chem. Abs., vol. 52, p. 175 18(e), 1958.
Craig: Chem. Abst., vol. 42, p. 8800(a), 1948.
Hahn: Chem. Abst., vol. 31, p. 5950(6), 1937.
HSU, Arch. Ins. Pharmacodyn, vol. CXXXIX, No. 3–4, pp. 318–327, 1962.
Wander: Chem. Abst., vol. 55, p. 21150(h), 1961.

JULIAN S. LEVITT, *Primary Examiner.*

NORRIS G. MANN, STANLEY J. FRIEDMAN, *Assistant Examiners.*